April 12, 1960

D. P. EDKINS 2,932,470

VARIABLE CONTOUR AIRFOIL

Filed May 24, 1955

Denis P. Edkins
INVENTOR.

BY *James M. Clark*

ATTORNEY.

April 12, 1960

D. P. EDKINS 2,932,470

VARIABLE CONTOUR AIRFOIL

Filed May 24, 1955

Denis P. Edkins
INVENTOR.

BY

ATTORNEY.

United States Patent Office 2,932,470
Patented Apr. 12, 1960

2,932,470

VARIABLE CONTOUR AIRFOIL

Denis P. Edkins, Irving, Tex., assignor to Chance Vought Aircraft, Incorporated, Dallas, Tex., a corporation of Delaware Application May 24, 1955, Serial No. 510,733

5 Claims. (Cl. 244—44)

The present invention relates to variable camber airfoils and aircraft wings and more particularly to an improved leading edge construction and arrangement for changing the contour of the leading edge of an aircraft wing.

It is frequently desirable in aircraft design to vary the profile or contour of an airfoil or wing in order to change its flight characteristics under certain operating conditions. A number of arrangements have heretofore been proposed for varying the contour or camber of an airfoil, and particularly its leading edge portion, and the present invention is directed to an improved airfoil leading edge with a controllable nose contour which, in response to pilot-operated or automatic control, is caused to assume either a sharp, short-radius nose profile or alternatively a blunt, longer-radius profile. The sharp profile is particularly well adapted for high speed level supersonic flight and the blunt profile serves to increase the lift-drag ratio of the airfoil and to decrease tendencies toward leading edge stall during take-off, landing, low speed level flight and maneuvers at low speed. The blunt leading edge profile is also particularly well adapted for combat maneuvers imposing relatively high "g" loads as well as for flight with positive angle of attack at relatively high Mach numbers in the range of Mach 0.9.

The improved controllable nose contour arrangement of the present invention includes: an air channel fixed interiorly of the airfoil nose and connected through a selective control means to sources of positive and negative air pressures; inner diaphragms fixed exteriorly on the nose surfaces of the airfoil; and an outer, flexible diaphragm connected to the inner diaphragms by a plurality of non-elastic threads. The outer diaphragm is selectively expanded into a particular extended contour adapted for flight at certain air speeds and aspect ratios when compressed air is admitted into the air channel, and it is partially retracted into the air channel when negative pressure is introduced into the channel to form a second or basic nose contour which is better adapted for flight at other speeds. In a modified form of the invention, the nose contour of the airfoil is controllable for selectively forming either the sharp, short-radius profile or a blunter, longer-radius profile provided with a drooped portion which provides flight characteristics of a desirable nature under certain operating conditions. The inner and outer diaphragms interconnected by the non-elastic threads form an inflatable bag-like fabric structure which is light in weight, collapsible and capable of containing relatively high internal pressures to provide a substantially rigid beam-like structure.

It is, accordingly, a major object of the present invention to provide an improved variable camber construction and mechanism for varying the contour of the leading edge of an airfoil or wing by the use of an inflatable fabric structure comprising inner and outer diaphragms or plies interconnected by a plurality of non-elastic cords or threads. A further object is the provision of a variable contour mechanism which is simple in construction and operation, which is light in weight and which does not impair the structural qualities of the wing. It is a further object of the present invention to produce a variable contour mechanism which is capable of providing either a sharp, short radius nose profile adapted for level supersonic flight or a blunt, long-radius profile which increases the lift-drag ratio of the airfoil and is more particularly adapted for take-off, landing and low speed maneuvers. It is a further object of this invention to make available a variable contour arrangement utilizing a flexible airtight member having inner and outer diaphragms interconnected by non-elastic threads, a diaphragm and the intermediate threads being folded and drawn into a recess in the airfoil in the retracted basic profile condition and expanded by outwardly pushing air forces in combination with the inwardly pulling forces exerted by the non-elastic threads to provide a different predetermined leading edge profile in the extended arrangement.

Other objects and advantages of the present invention will become apparent to those skilled in the art after reading the following specification and claims, taken in conjunction with the accompanying drawings, forming a part hereof, in which:

Figure 1:
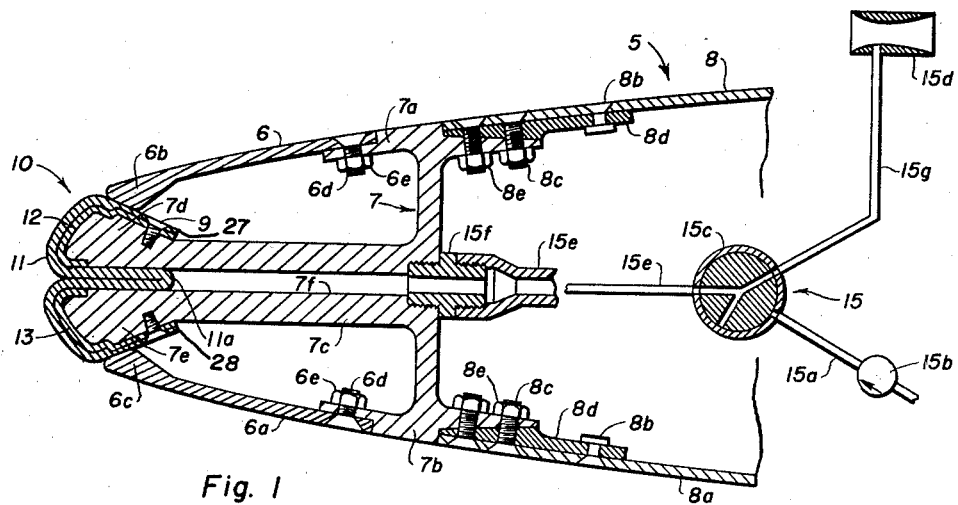
Fig. 1 is a cross-sectional view of the leading edge of an airfoil with the variable contour mechanism shown in its retracted condition.
Figure 2:
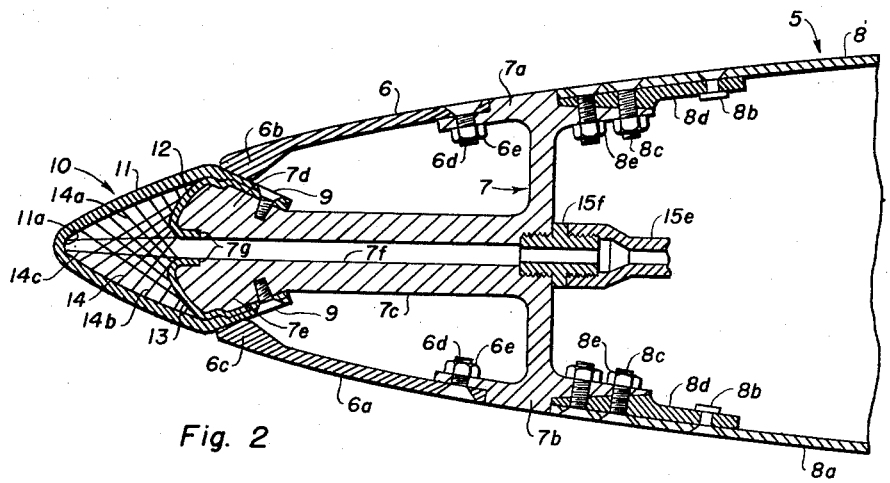
Fig. 2 is a similar view of the same with the variable contour mechanism shown in its inflated and extended position.

Referring now to Figs. 1 and 2, the numeral 5 indicates a wing or airfoil of which only the leading or nose portion is shown. The leading edge of the airfoil 5 comprises an upper nose panel 6 and a corresponding lower nose panel 6a, both of which are attached to the T-shaped leading edge member 7. The latter is generally T-shaped in cross-section with the stem 7c of the T extending horizontally forward or chordwise and terminating at the leading edge, the vertical web portion of the member 7 terminating in the upper and lower flanges 7a and 7b, respectively, to which the leading edge panels 6 and 6a are attached by the screws 6d and nuts 6e. The rearwardly extending portions of the flanges 7a and 7b are attached to the main skin covering panels 8 and 8a, together with the intermediate reinforcing strip elements 8d, by the attachment screws 8c and nuts 8e, and the rivets 8b.

The horizontal or chordwise extending central stem portion 7c of the T-shaped leading edge member 7 is provided with enlarged or bulbous end portions 7d and 7e at the leading edges of its upper and lower portions, respectively. The central stem portion 7c is provided with an air channel or passage 7f extending completely through the member in the fore and aft, or chordwise, direction. The modification in Figs. 1 and 2 illustrates an airfoil with a variable nose radius and constant nose chord plane. The forward edges of the panels 6 and 6a at their bulbous portions 6b and 6c, respectively, are separated by an interval or gap at the leading edge which is partially filled with the bulbous enlargements 7d and 7e on the forward end of the stem 7c of the leading edge member 7.

An air-tight bag-like member 10 has an inner upper diaphragm 12 which is rigidly bonded to the forward curved surfaces of the enlargement 7d and a corresponding lower diaphragm 13 bonded to the enlargement 7e. It also includes an outer diaphragm 11 which forms the forwardmost skin of the nose section and, in conjunction with the inner diaphragms 12 and 13, snugly fills the spaces between the bulbous end portions 6b and 6c of the upper and lower panels and the enlargements 7d and 7e. Each of the inner diaphragms 12, 13, as shown in Fig. 2, is formed from an initial single ply or piece separately bonded to the enlargements 7d and 7e above and below the passage 7f in flush relation therewith at the inset portions 7g. The inner diaphragms 12 and 13 are also attached to the enlargements 7d and 7e, together with the edges of the outer diaphragm 11, by the screws 9. The edges of the outer diaphragm 11 and the corresponding edges of the inner diaphragms 12 and 13 together form marginal tabs 27 and 28. The inner and outer diaphragms are interconnected by a plurality of non-elastic threads comprising an internal tie system 14. A series of such threads 14a of varying lengths extend from the upper and lower inner plies 12 and 13 to the inner face of the upper portion of the outer ply 11, and a similar series of threads 14b extend from the inner upper and lower plies 12 and 13 forwardly and downwardly to the inner surface of the bottom portion of the outer ply 11. Further series 14c of substantially horizontal threads extend from the inner surface of the external nose portion 11a back to the plies 12 and 13 at the mouth of the channel 7f.

It will be understood that the flexible inflatable nose portion 10 extends spanwise along substantially the entire length of the airfoil 5 and that the system of internal ties or threads 14 also extends at closely spaced intervals throughout the span-wise length of the leading edge member 7. The inner and outer plies of the flexible leading edge member 10 are suitably attached and sealed in an air-tight manner at their inner and outer ends as well as at their edges in the region of the screws 9. Each ply may preferably be made of a square-woven, pliable impregnated or rubberized, nylon fabric, and they are mutually interconnected by a plurality of pliable, nylon threads which along their length are interwoven within the fabric and repeatedly pass back and forth between the plies. These threads are non-elastic or non-stretching and definitely fixed-length and withstand relatively high tensile forces. Similar rubberized fabric sheets made into bags having parallel outer plies, as well as parallel interwoven threads of identical lengths, are available commercially on the market from certain rubber manufacturers, and when inflated are capable of withstanding relatively high external loads in respect to the weight of the inflated structure. When such bags, or thread-interconnected plies comprising the parallel faces, are inflated, the internal pressure exerted by the inflating gas forces the two plies in opposite directions. The plies are maintained parallel to each other and are held separated at a definite, predetermined spacing by the relatively non-elastic nylon threads which prevent separation of the plies beyond the uniform lengths of the thread-segments extending between and connecting the outer plies. While the outer plies are flexible, they are not elastic or stretchable, i.e. they do not lengthen when subjected to internal pressure.

The inflatable bag member 10 in Figs. 1 and 2, however, differs from the said commercially available material in that the interconnecting threads are specially located to form the criss-cross pattern of threads 14 shown in Fig. 2. The upper edge of the outer ply 11 is bonded to the adjacent edge of the upper inner ply 12, and the lower edge of the outer ply 11 is similarly secured to the adjacent edge of the inner lower ply 13. The inner plies 12 and 13 are also wrapped around and bonded or adhered to the bulbous portions 7d and 7e of the leading edge member 7 to which they and the outer ply 11 are additionally secured by the screws 9, together with suitable cap strip members where desirable. The double thickness formed by the inner and outer plies is also clamped against the bulbous portions 7d and 7e by means of the bulbous portions 6b and 6c of the upper and lower panels 6 and 6a when the attachment screws 6d are tightened. Because of the special lengths and positions of the threads 14a and 14b of the interconnecting thread system 14 in the inflatable structure 10, the ends of the threads could be bonded to the inner surfaces of the fabrics instead of being interwoven therewith as in the standard available material.

A typical pressure actuating system for the inflatable leading edge member 10 is indicated in Fig. 1 by the numeral 15. A suitable air pump (not shown) is connected to the pressure line 15a running through the check valve 15b to the two-way control valve 15c to provide the required inflating pressure for the member 10. A Venturi fitting 15d may be exposed to the relative airstream for the purpose of creating a partial vacuum, or negative pressure, and is similarly connected by the line 15g to the two-way control valve 15c. The latter is also connected by means of the common line or tube 15e, which may be a flexible hose or suitable tubing, to the fitting 15f by which it is attached to the web portion of the leading edge member 7 and placed in communication with the channel or passage 7f which extends forwardly between the inner plies 12 and 13 and is open to the interior of the inflatable member.

Fig. 1 shows the control valve 15c rotated to the position in which the Venturi fitting 15d is connected through the line 15e to the passage 7f, thus creating a partial vacuum therein and permitting the member 10 to be deflated and folded back into the retracted position in which it lies in close proximity to the inner plies 12 and 13 and its mid-portion, or the rounded leading edge portion 11a, is drawn into the passage or channel 7f. In this condition, the thread structure 14 collapses and lies pressed between adjacent plies without adding appreciably to the combined thickness thereof. During flight the deflation of the leading edge member 10 is assisted by the pressure created by the air-stream against the leading edge of the airfoil and is, of course, initiated by the removal of the internal pressure from the passage 7f upon its connection to the vacuum creating Venturi fitting 15d. In deflating the leading edge member 10 from the position shown in Fig. 2 to the retracted position of Fig. 1, it will be noted that the length of the individual threads in the thread structure 14 is such as to not only define the contour of the leading edge member in the inflated condition by restricting the separation of the plies at the ends of the respective non-elastic threads, but the lengths of these threads are also such that they permit retraction and collapse, or folding, of the outer ply 11 into the position shown in Fig. 1. The T-shaped member 7, the upper and lower nose panels 6 and 6a, the passage 7f and the inflatable member 10 extend substantially the entire length of the airfoil 5 along its leading edge. As shown in Fig. 1, the nose section assumes a blunt profile when negative pressure from the Venturi fitting 15d, or other vacuum creating source, is introduced into the passage 7f to thus retract the outer diaphragm 11 into the passage. When thus retracted, the outer diaphragm 11 lies in close contact with the surfaces of the inner diaphragms 12 and 13 against the enlargements 7d and 7e to form a blunt nose profile typified by a long nose radius.

When compressed air from the pump or other source of pressure is admitted into the passage 7f, the retracted portion 11a of the outer diaphragm 11 is forced out of the mouth of the passage 7f and the nose structure 10 becomes fully inflated. When extended and inflated the nose profile is typified by a sharp leading edge having a short nose radius and is firmly held in this shape or profile by the plurality of non-elastic threads which exert inwardly pulling forces in opposition to the outwardly pushing forces exerted on the outer diaphragm 11 by the compressed air.

Figure 3:
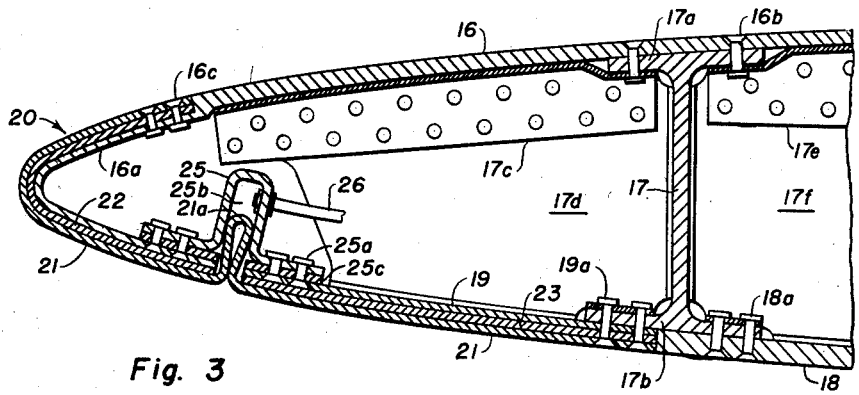
Fig. 3 is a cross-sectional view of a modified form of the invention with the contour changing member in its retracted position.
Figure 4:
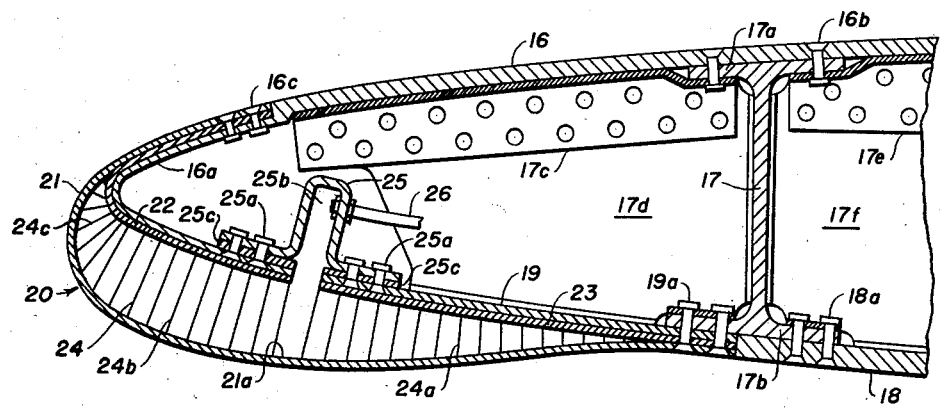
Fig. 4 is a similar view of the same with the contour changing member in its inflated and extended position.

Referring now to Figs. 3 and 4, the numeral 16 indicates an upper wing skin having a more sharply curved leading portion 16a of reduced skin thickness. The wing is provided with a transverse spar 17 having upper and lower flanges 17a and 17b, respectively, the upper skin covering 16 being attached to the upper flange 17a by means of the rivets 16b. The internal wing structure may also include the chordwise extending bulkheads 17d and 17f having stiffening angles 17c and 17e riveted to the upper portions thereof and in turn fastened to the undersurface of the upper skin covering 16. The wing structure also includes a lower surface skin covering 18 fastened to the lower spar flange 17b by the rivets 18a, and a forwardly extending undersurface skin portion 19 of lesser thickness attached to the flange 17b by the rivets 19a. The lower edges of the bulkhead members 17d and 17f may be suitably flanged for attachment to the inner surfaces of the lower skin portions 18 and 19. The nose portion 16a extends around the leading edge and terminates at the undersurface aft of the nose and appreciably forward of the spar 17 at a point spaced from the forward edge of the undersurface panel 19 to provide space therebetween for an air channel or passage 25b. Attached internally of the space between the panels 16a and 19 is a flanged channel or manifold 25 of hat-shaped cross-section attached to the opposed edges of the panels 16a and 19 by the rivets 25a passing through the spacer strips 25c.

An inflatable leading edge structure 20, comprising the inner plies or diaphragms 22 and 23 and the outer ply or diaphragm 21, is secured to the wing structure by means of the rivets 16c and 19a. As in the case of the modification shown in Figs. 1 and 2, a gap is left between the inner plies 22 and 23 at the air channel or passage 25b. The inner plies 22 and 23 are adhered or bonded to the panels 16a and 19, respectively, and the thickness of the two plies and the intermediate thread system 24 is substantially the same as the offset or recesses in the upper and lower wing surfaces, such as between the panel portions 16 and 16a, and between the panels 18 and 19, such that the resulting structure is flush and streamlined. The non-elastic thread system 24 interconnecting the diaphragms 21 and 22—23 comprises the approximately parallel threads 24a which gradually diminish in length at the lower aftmost portion of the inflatable structure 20 and are substantially continuous across the interrupted gap in the inner diaphragms, forward of which they extend into the further series 24b. At the forward end of the series of the threads 24b where the leading edge is curved about a shorter radius, the threads 24c preferably converge toward the inner ply 22. This embodiment illustrates an airfoil with variable nose section and droopable chord plane, and as in the case of the previous modification, the diaphragms may be made of flexible, non-stretchable airtight fabric material and are preferably interconnected by non-elastic threads. The conduit 26 is attached to and is open to the interior of the passage 25b within the channel 25 similarly to the modification shown in Figs. 1 and 2 whereby this channel and the interior of the inflatable nose portion may be selectively subjected to positive pressure or partial vacuum.

When negative pressures are applied to the interior of the inflatable nose structure 20, the structure is collapsed and the portion in the region of 21a of the outer diaphragm 21 is folded and retracted into the air channel 25b, bringing the remainder of the outer diaphragm into close contact with the fixed inner diaphragm portions 22 and 23. This results in a sharp airfoil profile as shown in Fig. 3 without the chord plane droop of Fig. 4. When compressed air is admitted through the tube 26 and into the air channel 25b, the retracted portion 21a of the outer diaphragm 21 is forced out of the channel and inflation of the outer diaphragm occurs. The outer diaphragm 21 is firmly held in its expanded profile by the outwardly pushing air forces in combination with the inwardly pulling forces exerted by the plurality of non-elastic threads forming the thread system 24 of various lengths interwoven or bonded between the inner and outer plies 21 and 22—23, the threads becoming taut as the outer diaphragm is fully expanded. This results in the contour shown in Fig. 4 in which the nose section assumes a less sharp profile with some nose chord plane droop beneath the leading portion of the wing.

For purposes of clarity, the fabric plies of the inflatable nose portions have been shown in both modifications somewhat thicker than the relative scale would prescribe. It will also be understood that the control for the inflatable-deflatable contour assemblies may be in response to pilot operated and/or automatic controls.

Other forms and modifications of the present invention, both with respect to its overall arrangement and the details of its respective parts, which will become apparent to those skilled in the art after reading the foregoing description, are intended to come within the scope and spirit of this invention as more particularly set forth in the appended claims.

I claim:

1. In an aircraft, a contour changing apparatus for a component having an elongated opening through an external surface thereof, said contour changing apparatus comprising: a substantially non-stretchable, flexible ply; opposite edges of said ply rigidly attached in a pressure-tight manner to said external surface of said component on respective, opposite sides of said opening; extra material in said ply beyond that required to cover the external surface of said component between said rigidly attached opposite edges, said extra material being retractable into said component through said elongated opening; and means for exerting positive and negative pressures at said opening, said flexible ply being so constructed and arranged that, upon the exertion of a positive pressure at said opening by said pressure-exerting means, said flexible ply is inflated to an extended position relative to said component and, upon the exertion of a negative pressure at said opening by said pressure-exerting means, said flexible ply is retracted against said external surface of said component said said extra material of said ply is drawn into said opening.

2. In a variable contour airfoil, a nose portion of said airfoil having a relatively fixed external surface provided with an elongated opening, said opening being located substantially at the leading edge of said airfoil; a substantially non-stretchable, flexible ply; opposite edges of said ply rigidly attached in a pressure tight manner to said external surface of said nose portion on respective opposite sides of said opening; extra material in said ply beyond that required to cover the external surface of said nose portion between said rigidly attached opposite edges, said extra material being retractable into said nose portion through said elongated opening; and means for exerting positive and negative pressures at said opening, said flexible ply and said external surface provided with said opening being so constructed and arranged that the exertion of a positive pressure at said opening by said pressure-exerting means effects inflation of said ply and extension thereof relative to said airfoil, and the exertion of a negative pressure at said opening by said pressure-exerting means effects retraction of said ply against said external surface, said extra material of said ply being drawn into said opening.

3. The combination claimed in claim 2, said opening and said ply extending generally spanwise of said airfoil.

4. In a variable contour airfoil, a nose portion of said airfoil having a relatively fixed external surface provided with an elongated opening communicating between the interior and exterior of said nose portion, said opening being located substantially at and extending along the leading edge of said airfoil; a flexible, substantially non-stretchable ply; opposite edges of said ply rigidly attached in a pressure tight manner to said external surface of said nose portion on respective, opposite sides of said opening; an excess of material in said ply beyond that required to cover said external surface between said rigidly attached edges, said excess material being retractable into said nose portion through said elongated opening; a plurality of non-elastic, fixed-length threads interconnecting the interior surface of said flexible ply with said external surface of said nose portion on opposite sides of said opening; and means for exerting positive and negative pressures at said opening, said flexible ply, interconnecting threads, and external surface provided with said opening being so constructed and arranged that the exertion of a positive pressure at said opening by said pressure exerting means effects inflation of said ply and extension of the same relative to said airfoil to a position determined by the lengths of said interconnecting threads, and the exertion of a negative pressure at said opening by said pressure exerting means effects retraction of said ply against said external surface, said excess material of said ply being drawn into said opening.

5. For a component of an aircraft, a contour changing device comprising: an elongated opening extending spanwise of said component and communicating between the interior and exterior of the latter; a substantially non-stretchable, flexible ply extending at least the length of said elongated opening; opposite edges of said ply rigidly attached in a pressure-tight manner to the external surface of said component on respective, opposite sides of said elongated opening; extra material in said ply beyond that required to cover the external surface of said component between said rigidly attached opposite edges of said ply, said extra material being retractable into said component through said elongated opening; a plurality of non-elastic fixed-length threads interconnecting the interior surface of said ply with the external surface of said component on opposite sides of said opening; and means for exerting positive and negative pressures at said elongated opening, whereby said flexible ply can be selectively inflated to a position determined by the fixed lengths of said threads and deflated to a position in which said ply is retracted against the external surface of said component and said extra material of said ply is drawn into said elongated opening.

References Cited in the file of this patent

UNITED STATES PATENTS

| | | |
|---|---|---|
| 2,378,528 | Arsandaux | June 19, 1945 |
| 2,539,576 | Gregg | Jan. 30, 1951 |
| 2,657,716 | Ford | Nov. 3, 1953 |

FOREIGN PATENTS

| | | |
|---|---|---|
| 1,003,096 | France | Nov. 14, 1951 |